(12) United States Patent
Kovács et al.

(10) Patent No.: US 12,725,035 B2
(45) Date of Patent: Sep. 1, 2026

(54) METHOD OF AND APPARATUS FOR MACHINE LEARNING IN A RADIO NETWORK

(71) Applicant: Nokia Technologies Oy, Espoo (FI)

(72) Inventors: István Z. Kovács, Aalborg (DK); Oana-Elena Barbu, Aalborg (DK); Melisa López, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 958 days.

(21) Appl. No.: 17/996,880

(22) PCT Filed: Apr. 24, 2020

(86) PCT No.: PCT/EP2020/061543
§ 371 (c)(1),
(2) Date: Oct. 21, 2022

(87) PCT Pub. No.: WO2021/213685
PCT Pub. Date: Oct. 28, 2021

(65) Prior Publication Data

US 2023/0144709 A1 May 11, 2023

(51) Int. Cl.
*G06N 3/08* (2023.01)

(52) U.S. Cl.
CPC .................................... *G06N 3/08* (2013.01)

(58) Field of Classification Search
CPC ...... G06N 3/08; G06N 3/0455; G06N 3/0464; G06N 3/0495; G06N 3/082; G06N 3/09;
(Continued)

(56) References Cited

U.S. PATENT DOCUMENTS

2019/0212981 A1* 7/2019 Park .................... G06F 7/49947
2020/0092736 A1* 3/2020 Futaki .................. H04W 16/14
(Continued)

FOREIGN PATENT DOCUMENTS

WO 2019/245239 A1 12/2019

OTHER PUBLICATIONS

"5G Automotive Association; Working Group System Architecture and Solution Development; 5GS Enhancements for Providing Predictive QoS in C-V2X", 5GAA TR-200055, Technical Report, 2018, pp. 1-60.
(Continued)

*Primary Examiner* — Reji Kartholy
(74) *Attorney, Agent, or Firm* — Lippes Mathias LLP

(57) ABSTRACT

A first apparatus (101) for a first method comprising receiving input data of at least one user equipment (102), determining an input to at least a part of at least one input layer (112A) of an artificial neural network depending on the input data, determining an output of a first part of the artificial neural network and transmitting the output of this part of the artificial neural network, and a second apparatus (105) for a second method comprising receiving an input for another part of the artificial neural network, determining an output of this part of the artificial neural network for at least one user equipment (102) depending on the input, the other part of the artificial neural network comprising at least a part of at least one hidden layer (118A) or at least a part of an output layer (114A) of the artificial neural network or at least a part of at least one hidden layer (118A) and at least a part of an output layer (114A) of the artificial neural network, and outputting the output.

21 Claims, 6 Drawing Sheets

(58) Field of Classification Search
CPC ...... G06N 3/092; G06N 3/098; G06N 3/0985; G06N 3/045; G06N 3/088; G06N 3/084; H04W 28/086
See application file for complete search history.

(56) References Cited

U.S. PATENT DOCUMENTS

| | | | | |
|---|---|---|---|---|
| 2020/0366537 | A1 * | 11/2020 | Wang | G06N 3/08 |
| 2020/0371756 | A1 * | 11/2020 | Oburu | G06Q 40/08 |
| 2021/0084534 | A1 * | 3/2021 | Kim | H04L 69/04 |
| 2021/0158151 | A1 * | 5/2021 | Wang | H04L 12/189 |

OTHER PUBLICATIONS

"5G NetMobil", 5G, Retrieved on Nov. 11, 2022, Webpage available at : https://5g-netmobil.de/.
"O-RAN Alliance", O-RAN, Retrieved on Nov. 11, 2022, Webpage available at : https://www.o-ran.org/.
"Unified architecture for machine learning in 5G and future networks", Focus group on Machine Learning for Future Networks including 5G (FG-ML5G), Technical Specification ITU-T FG-ML5G-ARC5G, Jan. 2019, 32 pages.
Mao et al., "Deep Learning for Intelligent Wireless Networks: A Comprehensive Survey", IEEE Communications Surveys & Tutorials, vol. 20, No. 4, Jun. 12. 2018, pp. 2595-2621.
Simeone, "A Very Brief Introduction to Machine Learning With Applications to Communication Systems", IEEE Transactions on Cognitive Communications and Networking, vol. 4, No. 4, Dec. 2018, pp. 648-664.
Zhang et al., "Deep Learning in Mobile and Wireless Networking: A Survey", IEEE Communications Surveys & Tutorials, vol. 21, No. 3, Mar. 13, 2019, pp. 2224-2287.
"Best Readings in Machine Learning in Communications", IEEE Communications Society, Retrieved on Nov. 11, 2022, Webpage available at : https://www.comsoc.org/publications/best-readings/machine learning-communications.
Ali et al., "Machine leaming based handover management for improved QoE in LTE", IEEE/IFIP Network Operations and Management Symposium, Apr. 25-29, 2016, pp. 794-798.
Mwanje et al., "Distributed cooperative Q-learning for mobility-sensitive handover optimization in LTE SON", IEEE Symposium on Computers and Communications (ISCC), Jun. 23-26, 2014, 6 pages.
Hughes et al., "Generative Adversarial Learning for Machine Learning empowered Self Organizing 5G Networks", International Conference on Computing, Networking and Communications (ICNC), Feb. 18-21, 2019, pp. 282-286.
Lin et al., "A Machine Learning Assisted Method of Coverage and Capacity Optimization (CCO) in 4G LTE Self Organizing Networks (SON)", Wireless Telecommunications Symposium (WTS), Apr. 9-12, 2019, pp. 1-9.
"New SID: Study on data collection further enhancement", 3GPP TSG RAN Meeting #86, RP-19xxxx, Agenda: 9.1.3, CMCC, Dec. 9-12, 2019, 4 pages.
Wu, "Introduction of Release 16 FS_eNA (Study of Enablers for Network Automation for 5G) in 3GPP SA2", Huawei Technologies Co. Ltd., 2018, pp. 1-28.
International Search Report and Written Opinion received for corresponding Patent Cooperation Treaty Application No. PCT/EP2020/061543, dated Feb. 19, 2021, 12 pages.
Teerapittayanon et al., "Distributed Deep Neural Networks Over the Cloud, the Edge and End Devices", IEEE 37th International Conference on Distributed Computing Systems (ICDCS), Jun. 5-8, 2017, pp. 328-339.
Chen et al., "Artificial Neural Networks-Based Machine Learning for Wireless Networks: A Tutorial", IEEE Communications Surveys & Tutorials, vol. 21, No. 4, Jul. 3, 2019, pp. 3039-3071.
Polese et al., "Machine Learning at the Edge: A Data-Driven Architecture with Applications to 5G Cellular Networks", arXiv, Apr. 7, 2019, 15 pages.
Office action received for corresponding European Patent Application No. 20722292.8, dated Nov. 6, 2025, 6 pages.

* cited by examiner

METHOD OF AND APPARATUS FOR MACHINE LEARNING IN A RADIO NETWORK

RELATED APPLICATION

This application was originally filed as PCT Application No. PCT/EP2020/061543, filed on Apr. 24, 2020, which is incorporated herein by reference in its entirety.

FIELD OF THE INVENTION

Various example embodiments described herein relate to machine learning in a radio network.

BACKGROUND

Artificial neural networks are deployed for machine learning in a radio access network.

SUMMARY

According to one aspect of the description, a first apparatus comprises at least a receiver configured to receive input data of at least one user equipment; a processor configured to determine an input to at least a part of at least one input layer of an artificial neural network depending on the input data and to determine an output of a part of the artificial neural network; and a transmitter configured to transmit the output of the part of the artificial neural network. The input data may be user plane data or control plane information received from the user equipment. The output data may be activations output by at least the part of the at least one input layer or activations output by at least a part of a hidden layer of the part of the artificial neural network. The output may be transmitted to a second apparatus.

The first apparatus may further comprise an interface configured to receive configuration or training information. The interface may comprise an F1-CP interface of a RAN. The interface may be configured for control plane signalling between distributed RAN nodes.

The interface may be configured to receive a first configuration command, wherein the processor may be configured to select the input for at least the part of the at least one input layer from the input data in particular the user plane or the control plane depending on the first configuration command for the first apparatus.

The interface may be configured to receive a second configuration command, wherein the processor may be configured to select the input layer for the input from a plurality of input layers or to select the at least part of the hidden layer depending on a second configuration command for the first apparatus.

The interface may be configured to receive configuration or training information; and the processor may be configured to configure at least one parameter of the artificial neural network depending on the configuration or training information. The training information may be back-propagation data or weights masking (dropout). For reinforcement learning the training information may comprise exploration or exploitation policies. The parameter may be a weight or hyper-parameter of the artificial neural network.

The interface may be configured to receive signalling information indicating an operating mode for training the artificial neural network or for inference with the artificial neural network; and the processor may be configured to operate the first apparatus in the operating mode for training the artificial neural network or in the operating mode for inference with the artificial neural network according to the signalling.

The interface may be configured to send signalling information indicating the operating mode for training the artificial neural network or the operating mode for inference with the artificial neural network selected depending on the signalling. The signalling information may be addressed to a second apparatus.

The interface may be configured to receive activations, and the processor may be configured to determine an output of the first apparatus depending on the activations. The output may be activations of the at least part of the hidden layer or output features of an output layer of the artificial neural network.

The processor may be configured to determine an output of the first apparatus depending on output features of an output layer of the artificial neural network. The output features may define an event or KPI for radio resource management, RRM.

The receiver may be configured to receive first input data from a first user equipment and second input data from a second user equipment and the processor is configured to determine the output of the part of the artificial neural network depending on input for the part of the artificial neural network determined depending on at least a part of the first input data and at least a part of the second input data.

The first apparatus may comprise a pre-processor configured to determine from the input data pre-processed input data, and wherein the processor is configured to determine the input for the input layer of the artificial neural network depending on the pre-processed input data. The input data may be raw data that is pre-processed.

The processor may be configured to determine an input to a hidden layer of the artificial neural network depending on an output of the at least one input layer, and to determine the output of the part of the artificial neural network depending on the output of the hidden layer.

According to one aspect of the description, a second apparatus comprises an input configured to receive an input for a part of an artificial neural network; a processor configured to determine an output of the part of the artificial neural network for at least one user equipment depending on the input, the part of the artificial neural network comprising at least a part of at least one hidden layer or at least a part of an output layer of the artificial neural network or at least a part of at least one hidden layer and at least a part of an output layer of the artificial neural network; and an output configured to output the output. The input may be activations output by an input layer or at least a part of at least one hidden layer of the artificial neural network.

The processor may be configured to determine a first configuration command for selecting an input for an input layer from input data depending on the first configuration command.

The processor may be configured to determine a second configuration command for selecting an input layer for an input from a plurality of input layers or for selecting at least part of the hidden layer depending on the second configuration command.

The processor may be configured to determine the output of the second apparatus depending on activations output by a hidden layer of the part of the artificial neural network.

The processor may be configured to determine the output of the second apparatus depending on output features of an output layer of the artificial neural network. The output features may define an event or KPI for radio resource management, RRM.

The receiver may be configured to receive input for at least a part of an output layer of the artificial neural network or the at least part of the hidden layer attributed to at least one user equipment and the processor is configured to determine a first output of the second apparatus attributed to the at least one user equipment.

The receiver may be configured to receive a first input for at least a part of the output layer or the at least part of the hidden layer attributed at least to a first user equipment and to a second user equipment and to receive a second input for at least a part of the output layer or the at least part of the hidden layer attributed at least to a third user equipment and a fourth user equipment and the processor is configured to determine at least a first output of the second apparatus attributed to the first user equipment, a second output of the second apparatus attributed to the second user equipment, a third output of the second apparatus attributed to the third user equipment and a fourth output of the second apparatus attributed to the fourth user equipment.

The processor may be configured to determine signalling to instruct a first apparatus to operate in an operating mode for training the artificial neural network or in an operating mode for inference with the artificial neural network and the second apparatus may comprise an interface to send the signalling information addressed to the first apparatus.

The second apparatus may comprise an interface configured to receive signalling information; and the processor may be configured to instruct the second apparatus to operate in an operating mode for training the artificial neural network or in an operating mode for inference with the artificial neural network selected depending on the signalling.

In one aspect of the description, a first method comprises receiving input data of at least one user equipment, determining an input to at least a part of at least one input layer of an artificial neural network depending on the input data, determining an output of a part of the artificial neural network, and transmitting the output of the part of the artificial neural network.

The method may comprise receiving a first configuration command, and selecting the input for at least the part of the at least one input layer from the input data in particular the user plane or the control plane depending on the first configuration command.

The method may comprise receiving a second configuration command, and selecting the at least one input layer for the input from a plurality of input layers or to select the at least part of the hidden layer depending on the second configuration command.

The method may comprise receiving configuration or training information in particular back-propagation data or weights masking, and configuring at least one parameter, in particular weight or hyper-parameter of the artificial neural network depending on the configuration or training information.

The method may comprise receiving signalling information indicating an operating mode for training the artificial neural network or for inference with the artificial neural network, and operating in the operating mode for training the artificial neural network or in the operating mode for inference with the artificial neural network according to the signalling.

The method may comprise sending signalling information indicating the operating mode for training the artificial neural network or the operating mode for inference with the artificial neural network selected depending on the signalling.

The method may comprise receiving activations, and determining an output depending on the activations.

The method may comprise determining an output depending on output features of the output layer.

The method may comprise receiving first input data of a first user equipment and second input data of a second user equipment, and determining the output of the part of the artificial neural network depending on input for the part of the artificial neural network determined depending on at least a part of the first input data and at least a part of the second input data.

The method may comprise determining from the input data pre-processed input data, and determining the input for the at least one input layer of the artificial neural network depending on the pre-processed input data.

The method may comprise determining an input to a hidden layer of the artificial neural network depending on an output of the at least one input layer, and determining the output of the part of the artificial neural network depending on the output of the hidden layer.

In one aspect of the invention, a second method comprises receiving an input for a part of an artificial neural network, determining an output of the part of the artificial neural network for at least one user equipment depending on the input, the part of the artificial neural network comprising at least a part of at least one hidden layer or at least a part of an output layer of the artificial neural network or at least a part of at least one hidden layer and at least a part of an output layer of the artificial neural network, and outputting the output.

The second method may comprise determining a first configuration command for selecting an input for at least one input layer from the input data depending on the first configuration command.

The second method may comprise determining a second configuration command for selecting an input layer for an input from a plurality of input layers or for selecting at least part of the hidden layer depending on the second configuration command.

The second method may comprise determining the output depending on activations output by a hidden layer of the part of the artificial neural network.

The second method may comprise determining the output depending on output features of the output layer.

The second method may comprise receiving the input for at least a part of the output layer or the at least part of the hidden layer attributed to at least one user equipment and determining a first output attributed to the at least one user equipment.

The second method may comprise receiving a first input for at least a part of the output layer or the at least part of the hidden layer attributed at least to a first user equipment and to a second user equipment and receiving a second input for at least a part of the output layer or the at least part of the hidden layer attributed at least to a third user equipment and a fourth user equipment, and determining at least a first output attributed to the first user equipment, a second output attributed to the second user equipment, a third output attributed to the third user equipment and a fourth output attributed to the fourth user equipment.

The second method may comprise determining signalling to instruct a first apparatus to operate in an operating mode for training the artificial neural network or in an operating mode for inference with the artificial neural network, and sending the signalling information addressed to the first apparatus.

The second method may comprise receiving signalling information; and instructing a second apparatus to operate in an operating mode for training the artificial neural network or in an operating mode for inference with the artificial neural network selected depending on the signalling.

A user equipment may be connectable at least temporarily to at least one first apparatus, wherein the user equipment is configured to send to the at least on first apparatus input data, in particular user plane data or control plane information, for at least a part of at least one input layer of an artificial neural network.

DESCRIPTION

Figure 1:
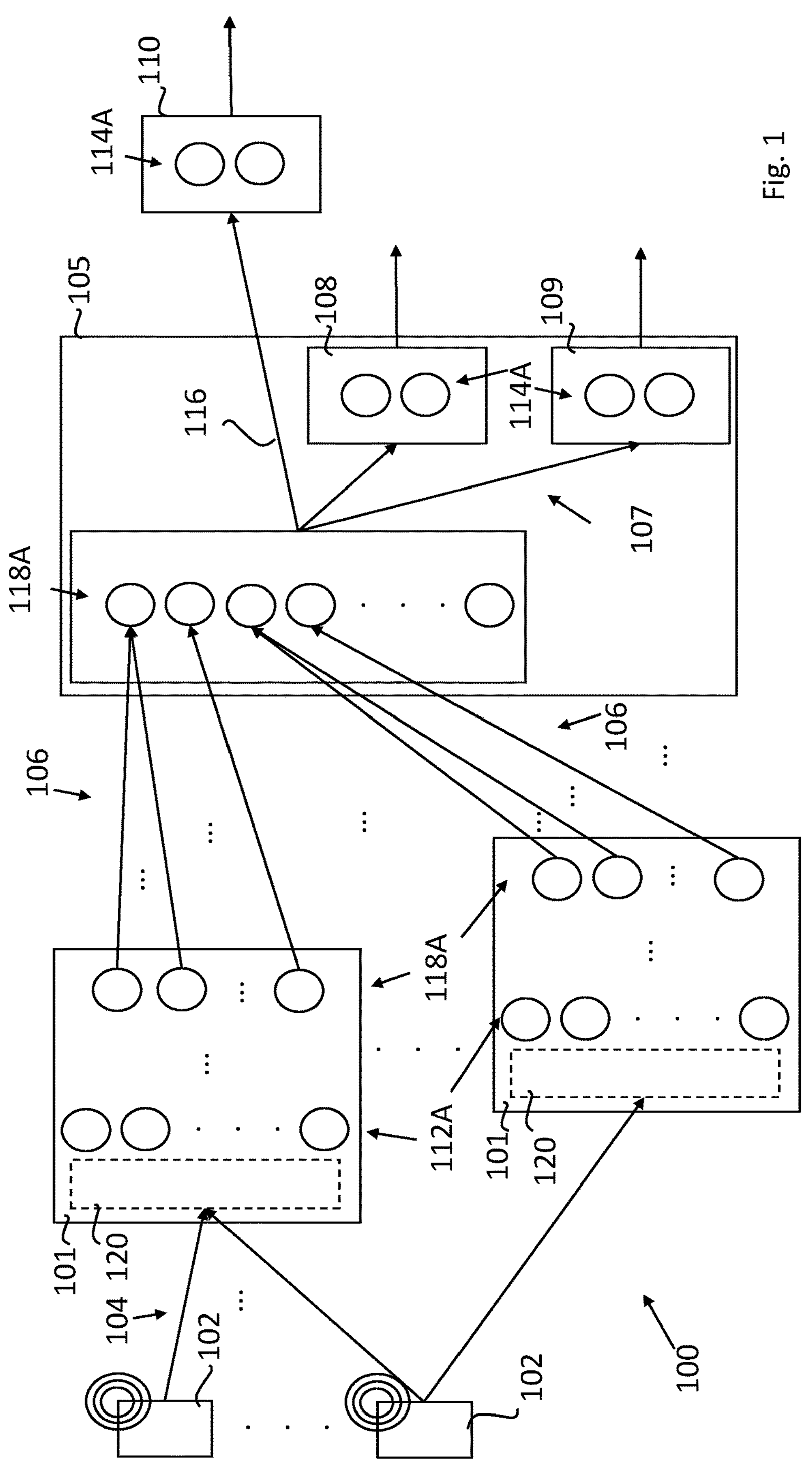
FIG. 1 depicts schematically first aspects of a distributed machine learning system.

FIG. 1 schematically depicts first aspects of a distributed machine learning system 100 in particular for a radio access network, RAN. The RAN may be a next generation RAN, NG-RAN. The RAN comprises a first apparatus 101 configured to receive input data from a user equipment 102 via a link 104. The link 104 may be a radio link. The input data may be user plane data or control plane information.

The user plane data may be processed by a user plane protocol stack between the first apparatus 101 and the user equipment 102. The user plane protocol stack may comprise sub-layers: Packet Data Convergence Protocol (PDCP), radio Link Control (RLC), Medium Access Control (MAC) or Service Data Adaptation Protocol (SDAP). The control plane data may be processed by a control plane protocol stack comprising a Radio Resource Control layer (RRC). The control plane protocol stack may also comprise Packet Data Convergence Protocol (PDCP), radio Link Control (RLC), Medium Access Control (MAC). The RRC may be configured to configure the sub-layers.

The first apparatus 101 may be configured to receive input data from a plurality of user equipment 102. The user equipment 102 may be connected to one first apparatus 101 at a time. The user equipment 102 may be connected to two or more user equipment 102 at a time.

The RAN may comprise a plurality of first apparatus 101. FIG. 1 depicts two first apparatus 101.

The RAN comprises a second apparatus 105 configured to at least temporarily communicate with at least one first apparatus 101 via an interface 106.

The first apparatus 101 may be a next generation evolved node B distributed unit, gNG-DU. The interface 106 may comprise a F1 control plane interface, F1-CP. The interface 106 may support signalling between endpoints. An endpoint may be a user equipment or a first apparatus 101. The interface 106 may enable an exchange of user equipment associated and non-user equipment associated signalling.

The second apparatus 105 may comprise an interface 107 to at least one Non-RealTime Load Balancing function 108 or to at least one Near-RealTime Hand Over function 109. These load balancing mechanisms are examples. Generally the interface 107 may be an interface to any other radio resource management, RRM, mechanism, e.g. for a Realtime RRM function or Near-Realtime RRM function. For a core network the interface 107 may for example be to a Non-Realtime RRM function. The second apparatus 105 may be configured to at least temporarily communicate with at least one network analytics function 110 via a data link 116 in particular for Non-RealTime Traffic shaping.

According to the first aspect, the distributed machine learning system 100 comprises a first artificial neural network comprising a first input layer 112A and a first output layer 114A. The first artificial neural network may comprise at least one first hidden layer 118A. In the example depicted in FIG. 1, the first input layer 112A is distributed over a plurality of first apparatus 101. In the example depicted in FIG. 1, the first output layer 114A is distributed within the second apparatus 105. The first output layer 114A may be distributed over the at least one Non-RealTime Load Balancing function 108, the at least one Near-RealTime Hand Over function 109, and the at least one analytics function 110. These load balancing mechanisms are examples. Generally the function 108 may be for any other radio resource management, RRM, mechanism, e.g. for the Realtime RRM function or Near-Realtime RRM function. For the core nework the interface 107 may for example be to the Non-Realtime RRM function. Other distribution schemes may be implemented as well.

The first apparatus 101 may comprise a pre-processing input 120 that is configured to process raw data received from a user equipment 102 into input data for the first input layer 112A.

The output of the first artificial neural network may be output features for Non-RealTime Load Balancing, Near-RealTime Load Balancing or Non-RealTime Traffic shaping.

Figure 2:
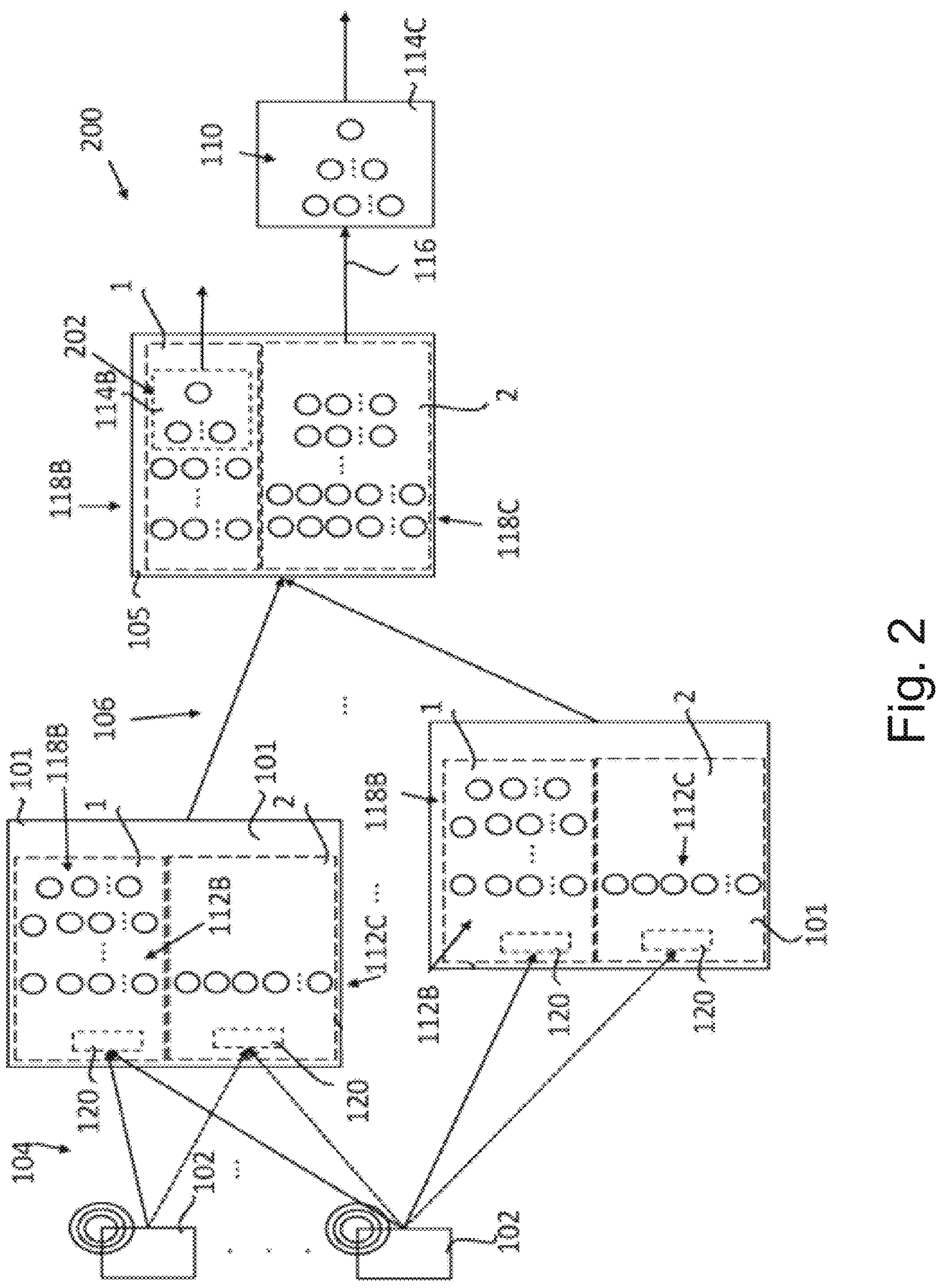
FIG. 2 depicts schematically second aspects of a distributed machine learning system, FIG. 3 schematically depicts parts of a first apparatus, FIG. 4 schematically depicts parts of a second apparatus, FIG. 5 schematically depicts aspects of an architecture for distributed machine learning in a radio access network, FIG. 6 schematically depicts a sequence diagram for operating a distributed machine learning system.

FIG. 2 schematically depicts second aspects of a distributed machine learning system 200 in particular for the RAN. According to the second aspect, the distributed machine learning system 200 comprises at least one of the first apparatus 101 configured to receive input data from at least one user equipment 102 via the link 104. The at least one of the first apparatus 101 may comprise the pre-processing input 120. According to the second aspect, the distributed machine learning system 200 comprises at least one of the second apparatus 105 configured to communicate at least temporarily with the at least one of the first apparatus 101 via the interface 106.

The at least one second apparatus 105 may be configured to at least temporarily communicate with the at least one network analytics function 110 via the data link 116 in particular for Non-RealTime Traffic shaping.

The distributed machine learning system 200 comprises a second artificial neural network comprising a second input layer 112B and a second output layer 114B. The second artificial neural network may comprise at least one second hidden layer 118B. In the example depicted in FIG. 2, the second input layer 112B is distributed over a plurality of first apparatus 101. In the example depicted in FIG. 2, the second apparatus 105 comprises the second output layer 114B. The second output layer 114B in the example is deployed within a RealTime Load Balancing function 202. Other distribution schemes may be implemented as well.

The output of the second artificial neural network may be output features for RealTime Load Balancing.

According to the second aspect, the distributed machine learning system 200 comprises a third artificial neural network comprising a third input layer 112C and a third output layer 114C. The third artificial neural network may comprise at least one third hidden layer 118C. In the example depicted in FIG. 2, the third input layer 112C is distributed over a plurality of first apparatus 101. In the example depicted in FIG. 2, the analytics function 110 comprises a third output layer 114C. Other distribution schemes may be implemented as well.

The output of the third artificial neural network may be output features for RealTime Traffic shaping.

RealTime Load Balancing is a first use case 1 for the distributed machine learning system 200 according to the second aspect. Non-RealTime Traffic shaping is a second use case 2 for the distributed machine learning system 200 according to the second aspect.

Figure 3:
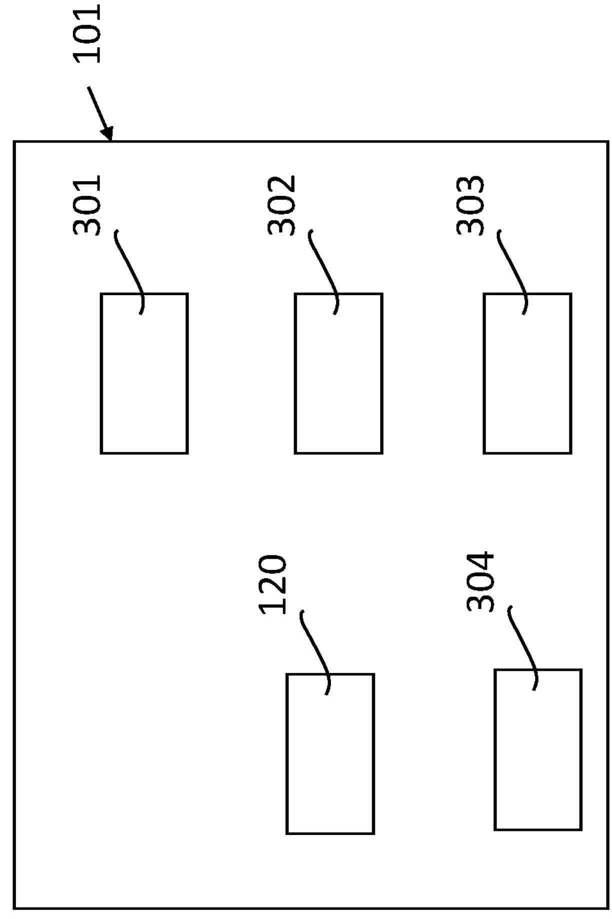

FIG. 3 schematically depicts parts of an exemplary first apparatus 101. The first apparatus 101 is configured to process data for an artificial neural network. The artificial neural network may be the first artificial neural network, the second artificial neural network or the third artificial neural network.

The first apparatus 101 comprises a receiver 301 configured to receive the input data in particular the user plane data or the control plane information from at least one user equipment 102.

The first apparatus 101 comprises a processor 302 configured to determine an input to at least a part of the at least one input layer of the artificial neural network depending on the input data.

The processor 302 is configured to determine an output of a part of the artificial neural network, in particular an activation function output by the at least one input layer or activations output by at least the part of the hidden layer of the part of the artificial neural network. In the context of this disclosure, activation, activation function and activation function output refers in particular to an output of an activation function at an input layer, a hidden layer or an output layer of the artificial neural network.

The first apparatus 101 comprises a transmitter 303 configured to transmit the output of the part of the artificial neural network in particular to the second apparatus 105.

The processor 302 may be configured to select the input for at least the part of the at least one input layer from the input data in particular the user plane or the control plane depending on a first configuration command for the first apparatus 101.

The processor 302 may be configured to select the input layer for the input from a plurality of input layers or to select the at least part of the hidden layer depending on a second configuration command for the first apparatus 101.

The first apparatus 101 may further comprise an interface 304 configured to receive the first configuration command or the second configuration command in particular from the second apparatus 105. The interface 304 may comprise the F1-CP interface of the RAN.

The first apparatus 101 may comprise the pre-processor 120 configured to determine from the input data pre-processed input data. The processor 302 may be configured to determine the input for at least the part of the at least one input layer of the artificial neural network depending on the pre-processed input data. The input data may be the raw data that is pre-processed.

The processor 302 may be configured to determine an input to a hidden layer of the artificial neural network depending on an output of the at least one input layer, and to determine the output of the part of the artificial neural network depending on the output of the hidden layer.

The interface 304 may be configured to receive configuration or training information in particular back-propagation data or weights masking (dropout). This configuration or training information may be receivable from the second apparatus 105. The processor 302 may be configured to configure at least one parameter, in particular weight or hyper-parameter of the artificial neural network depending on the configuration or training information. The processor 302 may be configured to configure at least one parameter, in particular weight or hyper-parameter of the part of the artificial neural network implemented within the first apparatus 101.

The interface 304 may be configured to receive signalling information indicating an operating mode for training the artificial neural network or for inference with the artificial neural network. The processor 302 may be configured to operate the first apparatus 101 in the operating mode for training the artificial neural network or in the operating mode for inference with the artificial neural network according to the signalling.

The processor 302 may be configured to configure at least one parameter, in particular a weight or a hyper-parameter, a bias or an activation function, of the part of the artificial neural network in the operating mode for training. The processor 302 may be configured to determine the output of the first apparatus 101 depending on the at least one parameter, in particular weight or hyper-parameter of the part of the artificial neural network in the operating mode for inference.

The interface 304 may be configured to send in particular addressed to the second apparatus 105 signalling information indicating the operating mode for training the artificial neural network or the operating mode for inference with the artificial neural network selected depending on the signalling.

The interface 304 may be configured to receive activations. The processor 302 may be configured to determine the output of the first apparatus 101, in particular activations of the at least part of the hidden layer or output features of an output layer of the artificial neural network depending on the activations.

The processor 302 may be configured to determine an output of the first apparatus 101, in particular an event or key performance indicator, KPI, for radio resource management, RRM, depending on output features of the output layer. The first apparatus 101 may comprise at least a part of the output layer.

The receiver 301 may be configured to receive first input data from a first user equipment 102 and second input data from a second user equipment 102. The processor 304 may be configured to determine the output of the part of the artificial neural network depending on input for the part of the artificial neural network determined depending on at least a part of the first input data and at least a part of the second input data.

Figure 4:
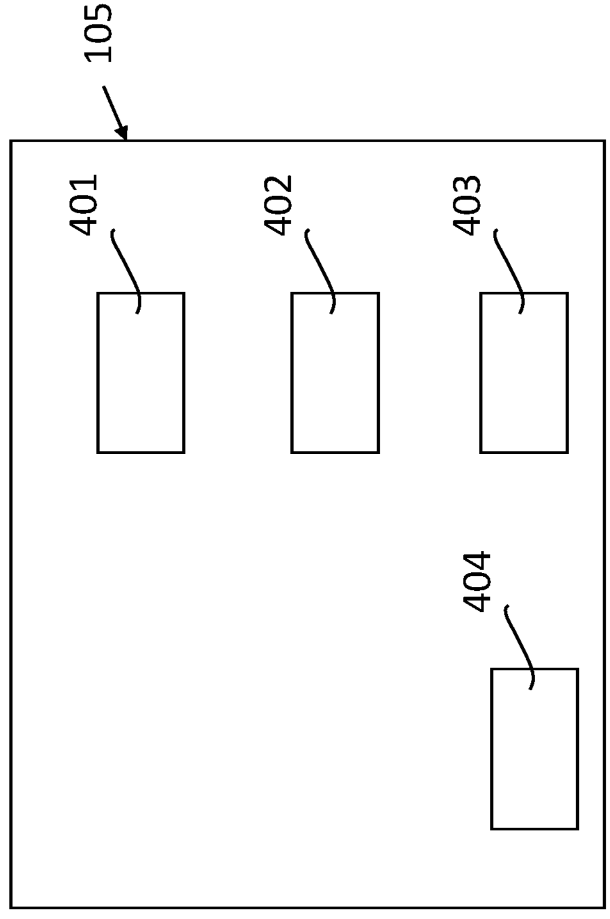

FIG. 4 schematically depicts parts of an exemplary second apparatus 105.

The second apparatus 105 comprises an input 401 configured to receive an input for a part of an artificial neural network, in particular activations output by an input layer or at least a part of at least one hidden layer of the artificial neural network. The part of the artificial neural network implemented in the second apparatus 105 comprises for example at least a part of at least one hidden layer or at least a part of an output layer of the artificial neural network. The part of the artificial neural network implemented in the second apparatus 105 comprises may comprise at least a part of at least one hidden layer and at least a part of an output layer of the artificial neural network.

The second apparatus 105 comprises a processor 402 configured to determine an output of the second apparatus 105 depending on the input.

The second apparatus 105 comprises an output configured to output the output of the second apparatus 105.

The processor 402 may be configured to determine a first configuration command for the first apparatus 101 for selecting the input for the input layer from the input data in particular the user plane or the control plane depending on the first configuration command for the first apparatus 101.

The processor 402 may be configured to determine a second configuration command for the first apparatus 101 for selecting the input layer for the input from a plurality of input layers or for selecting the at least part of the hidden layer depending on the second configuration command for the first apparatus 101.

The processor 402 may be configured to determine the output of the second apparatus 105 depending on activations output by a hidden layer of the part of the artificial neural network.

The processor 402 may be configured to determine the output of the second apparatus 105, in particular an event or KPI for radio resource management, RRM, depending on output features of the output layer.

The receiver 401 may be configured to receive input from a plurality of user equipment 102.

By way of one example, the receiver 401 may be configured to receive the input for at least a part of the output layer or the at least part of the hidden layer attributed to at least one user equipment 102. The processor 402 may be configured to determine a first output of the second apparatus 105 attributed to the at least one user equipment 102.

By way of example another example, the receiver 401 may be configured to receive a first input for at least a part of the output layer or the at least part of the hidden layer attributed at least to a first user equipment 102 and to a second user equipment 102 and to receive a second input for at least a part of the output layer or the at least part of the hidden layer attributed at least to a third user equipment 102 and a fourth user equipment 102. The processor 402 may be configured to determine at least a first output of the second apparatus 105 attributed to the first user equipment 102, a second output of the second apparatus 105 attributed to the second user equipment 102, a third output of the second apparatus 105 attributed to the third user equipment 102 and a fourth output of the second apparatus 105 attributed to the fourth user equipment 102.

The processor 402 may be configured to determine signalling to instruct a first apparatus 101 to operate in an operating mode for training the artificial neural network or in an operating mode for inference with the artificial neural network and the second apparatus may comprise an interface 403 to send the signalling information addressed to the first apparatus 101.

The interface 403 may be configured to receive signalling information. The processor 402 may be configured to instruct the second apparatus 105 to operate in an operating mode for training the artificial neural network or in an operating mode for inference with the artificial neural network selected depending on the signalling.

The processor 402 may be configured to operate the second apparatus 105 in the operating mode for training the artificial neural network or in the operating mode for inference with the artificial neural network according to the signalling.

The processor 402 may be configured to configure at least one parameter, in particular weight or hyper-parameter of the part of the artificial neural network in the operating mode for training.

The processor 402 may be configured to determine the output of the second apparatus 105 depending on the at least one parameter, in particular weight or hyper-parameter of the part of the artificial neural network in the operating mode for inference.

The processor 402 may be configured to determine the configuration or the training information. The processor 402 may be configured to determine the back-propagation data or weights masking (dropout) for at least one first apparatus 101. The back-propagation data or dropout may be determined from an output of the artificial neural network in response to training data in a training.

Figure 5:
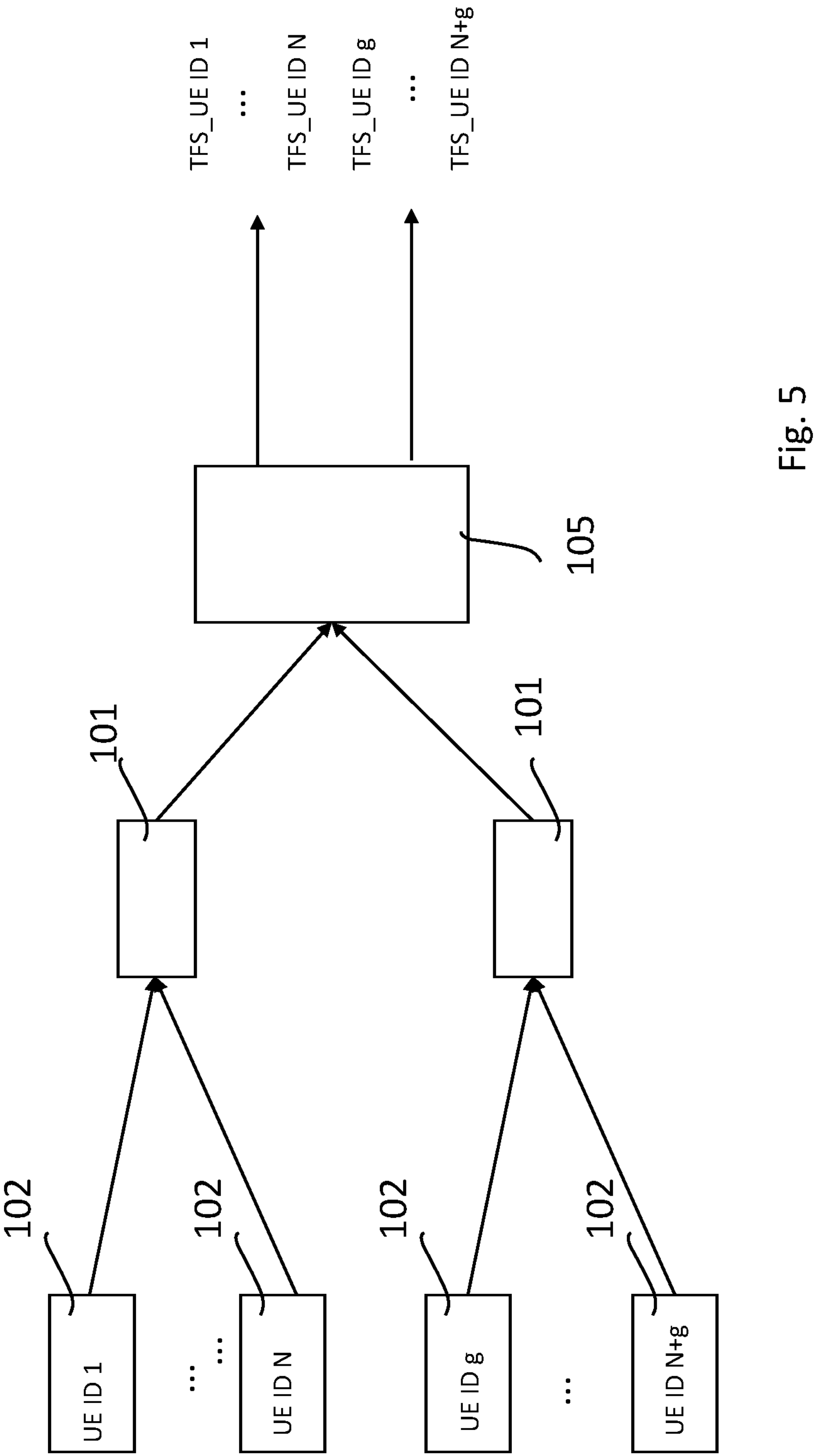

FIG. 5 schematically depicts aspects of an architecture for distributed machine learning in the RAN.

According to this aspect, there may be a first group of N−1 first user equipment 102, UE ID 1, . . . , UE ID N and a second group of g−1 second user equipment 102, UE ID g, . . . UE ID N+g. The first user equipment 102 of the first group may be connected to one first apparatus 101 and the second user equipment 101 of the second group may be connected to another first apparatus 101. The first user equipment 101 and the second user equipment 101 may be configured to transmit a timestamp or at least one parameter as the input data. In the example K parameters for example K=6 parameters 1 to 6 are transmitted. The one first apparatus 101 and the other first apparatus 101 may be connected to the second apparatus 105. With the artificial neural network, the input data in particular K input parameters from different user equipment are encoded or compressed.

The receiver 301 of the one first apparatus 101 according to this aspect is configured to receive first input data from the first user equipment 102 of the first group and second input data from the second user equipment 102 of the first group.

The receiver 301 of the other first apparatus 101 according to this aspect is configured to receive first input data from the first user equipment 102 of the second group and second input data from the second user equipment 102 of the second group.

The processor 304 of the one first apparatus 101 according to this aspect is configured to determine the output of its part of the artificial neural network depending on the input from the first group.

The processor 304 of the other first apparatus 101 according to this aspect is configured to determine the output of its part of the artificial neural network depending on the input from the second group.

The receiver 401 of the second apparatus 105 in this aspect is configured to receive the input for at least a part of the output layer or the at least part of the hidden layer attributed to the user equipment 102 of the first group and the second group.

The receiver 401 of the second apparatus 105 in this aspect is configured to receive a first input attributed at least to the first user equipment 102 and to the second user equipment 102 of the first group. The receiver 401 of the second apparatus 105 in this aspect is configured to receive a second input attributed at least to the third user equipment 102 and the fourth user equipment 102.

The processor 402 of the second apparatus 105 is configured to determine at least a first output TFS_UE ID 1 of the second apparatus 105 attributed to the first user equipment 102, a second output TFS_UE ID N of the second apparatus 105 attributed to the second user equipment 102, a third output TFS_UE ID g of the second apparatus 105 attributed to the third user equipment 102 and a fourth output TFS_UE ID N+g of the second apparatus 105 attributed to the fourth user equipment 102.

In this aspect the first output may be determined by the second apparatus 105 for the first user equipment 102, UE ID 1. The second output may be determined by the second apparatus 105 for the other first user equipment 102, UE ID N. In the example the first output TFS_UE ID g may be determined for the one second user equipment 102, UE ID g and the second output TFS_UE ID N+g may be determined for the other second user equipment 102, UE ID N+g.

The artificial neural network may in this aspect be trained for a cell in the RAN for allocation per user equipment so that a composite cell metric is maximized.

Four examples are provided below.

Example 1

According to Example 1, the first apparatus 101 is a gNB Distributed Unit, gNB-DU. According to Example 1, the second apparatus 105 is a gNB-Control unit gNB-CU. The gNB-DU and the gNB-CU is at least temporarily part of a NG-RAN. The NG-RAN comprises other NG-RAN nodes. A NG-RAN node may be either a gNB-DU, a gNB-CU or a gNB.

gNB-CU may refer to a logical node hosting RRC, SDAP and PDCP protocols of the gNB or RRC and PDCP protocols of the that controls the operation of one or more gNB-DUs. The gNB-CU terminates the F1 interface connected with the gNB-DU.

gNB-DU may refer to a logical node hosting RLC, MAC and PHY layers of the gNB, and its operation is partly controlled by gNB-CU. One gNB-DU supports one or multiple cells. One cell is supported by one gNB-DU. The gNB-DU terminates the F1 interface connected with the gNB-CU.

gNB may refer to a node providing user plane and control plane protocol terminations towards user equipment, UE.

The gNB-DU and the gNB-CU are a part of the distributed machine learning system according to Example 1. the distributed machine learning system may comprise a plurality of gNB-DU and a plurality of gNB-CU.

The gNB-DU comprises a part of an input layer of the distributed machine learning system. A plurality of gNB-DU may be grouped in a pre-configured group of NG-RAN nodes which share a common characteristic. The common characteristic of the group of NG-RAN nodes is for example that the gNB-DUs of the group are located in a geographical area, are connected to the gNB-CU or have similar traffic patterns.

A common characteristic for a plurality of NB-CU of the distributed machine learning system may be that they are connected to at least one gNB-DU of the group.

The hidden layer or the hidden layers of the artificial neural network may be fully or partially distributed across the plurality of gNB-DU. The gNB-DU may comprise the hidden layer, a part of the hidden layer, parts of a plurality of hidden layers or a plurality of hidden layers of the artificial neural network. The gNB-DU may comprise a part of at least one distributed hidden layer of the artificial neural network.

The gNB-CU may comprise a part of at least one distributed hidden layer or at least a part of an output layer of the artificial neural network. The gNB-CU may comprise the hidden layer, a part of the hidden layer, parts of a plurality of hidden layers or a plurality of hidden layers of the artificial neural network.

When the gNB-DU or the gNB-CU comprises the part of the hidden layer, another NG-RAN node may comprise another part of the hidden layer. Other NG-RAN nodes may comprise other parts of the hidden layer.

The hidden layer or the output layer may be fully or partially distributed across one or more NG-RAN nodes of the NG-RAN. The one or more NG-RAN nodes may share the common characteristic. The one or more NG-RAN nodes may be located in the substantially same geographical area.

The gNB-DU may comprise the output layer. The output layer may be fully or partially distributed across one or more NG-RAN nodes sharing the common characteristic. The gNB-DU may comprise part of the output layer in this case.

In one aspect, a part of the artificial neural network is implemented on the gNB-DU or on a plurality of gNB-DU and another part of the artificial neural network is implemented on the gNB-CU or on a plurality of gNB-CU.

Example 2

Example 2 is based on the Example 1. Entities or functions of same name are references to those entities or functions of Example 1.

According to Example 2, other NG-RAN nodes than in Example 1 or other 5GCN functions may comprise a part of the artificial neural network according to Example 1.

The at least part of the hidden layer or the output layer may be at least a part of a combining layer. The combining layer may have weights which can be turned on/off via control signalling from a NG-RAN node and/or a 5GCN function.

The gNG-DU may comprise at least a part of the combining layer. This part of the combining layer may receive input from the part of the input layer the gNG-DU comprises. This at least part of the combining layer may receive input from at least one other input layer. The at least one other input layer may be implemented in at least one other NG-RAN node.

The part of the combining layer the gNG-DU comprises may receive input from the part of the hidden layer the gNG-DU may comprise. This at least part of the combining layer may receive input from at least one other hidden layer. The at least one other hidden layer may be implemented in at least one other NG-RAN node.

Another NG-RAN node may comprise another part of the combining layer. Other NG-RAN nodes may comprise other parts of the combining layer.

At least one NG-RAN node sharing the common characteristic with the gNG-DU may comprise another part of the combining layer.

The output of the part of the artificial neural network may be activations of the at least part of the combining layer or output features of the at least a part of the combining layer.

The gNB-DU may receive activations from a plurality of NG-RAN nodes. The at least part of the combining layer may combine the activations of the plurality of NG-RAN nodes to determine, in case the combining layer comprises hidden layer activation functions, or to determine, in case the combining layer is an output layer, output features.

The gNB-CU may comprise at least a part of the combining layer. This at least part of the combining layer may have weights which can be turned on/off via control signalling from a NG-RAN node and/or a 5GCN function. There may be at least one NG-RAN node sharing the common characteristic with the gNG-CU which implements another part of the combining layer with inputs from at least one other input layer or at least one other hidden layer. The at least one other input layer or at least one other hidden layer may be implemented in at least one other NG-RAN node. The output of the part of the artificial neural network the gNB-CU comprises may be activations of the at least part of the hidden layer or output features of the at least a part of an output layer.

Example 3

Example 3 may based on the Example 1 or Example 2. Entities or functions of same name are references to those entities or functions described above.

The artificial neural network according to Example 3 comprises an autoencoder.

The autoencoder comprises at least an input layer, referred to as encoder, an output layer, referred to as decoder and a hidden layer, referred to as encoding layer.

Input to the input layer is mapped by the encoder to the encoding layer. The decoder maps the output of the encoding layer to the decoder's output layer to reconstruct the original input. The dimension of the output layer of the encoder is significantly smaller than the dimension of the input layer. The dimension of the encoding layer is significantly smaller than the dimension of the output layer.

The input layer and the output layer may have the substantially same dimension. The autoencoder is trained to mitigate reconstruction loss, e.g. a difference between the input and the output.

The gNB-DU in this example comprises the input layer or comprises a part of the input layer of the autoencoder.

The gNB-DU may comprise the encoder or a part of the encoder of the autoencoder. The gNB-DU may comprise the decoder or a part of the decoder of the autoencoder. The gNB-DU may comprise the encoding layer or a part of the encoding layer of the autoencoder.

Other NG-RAN nodes may comprise other parts of the input layer. The NG-RAN nodes that comprise parts of the input layer may share the common characteristic. The hidden layer may be the encoding layer of the autoencoder or a part thereof.

The encoder of the autoencoder may be implemented at the gNB-DU. The encoder may receive as input K parameters from N UEs it serves.

The gNB-CU may comprise at least a part of the decoding layer of the autoencoder. Other NG-RAN nodes may comprise other parts of the decoding layer. The NG-RAN nodes that comprise parts of the decoding layer may share the common characteristic. The gNB-CU may comprise the encoding layer of the autoencoder or a part thereof as well.

In one aspect, a first encoder may compress the resulting observation set of dimension N×K to a compressed set of dimension P<<NK. The compressed set may be sent to the gNB-CU as input. The gNB-CU may comprise the encoding layer for the input and a first decoder for the input. The gNB-CU may comprise a second encoder for a second compression step for the input. The second encoder may encode the input depending on domain knowledge. The input for the gNB-CU may be further downsized by the second encoder to a resulting set of dimension L<<P. The gNB-CU may comprise a second decoder for the resulting set. The second decoder may determine at least a part of a reconstruction of the at least part of the compressed set.

A analytics function may comprise the second decoder for the resulting set. The analytics function may comprise the first decoder for reconstructing at least a part of the observation set from the at least part of the reconstruction of the at least part of the compressed set. In the example, the K parameters from the N UEs are reconstructed. The analytics function may process the K parameters input for the N UEs from the gNB-CU and may decide on a time frequency slicing, TFS, for the RAN.

Example 4

Example 4 may be based on the Example 1, Example 2 or the Example 3. Entities or functions of same name are references to those entities or functions described above.

The artificial neural network according to the Example 4 may comprise an architecture for compression and decompression.

The gNB-DU in this example comprises the input layer or that a part of the input layer for a compression. Other NG-RAN nodes may comprise other parts of the input layer. The NG-RAN nodes that comprise parts of the input layer may share the common characteristic. The gNB-DU may comprise at least a part of an output layer for a decompression.

For example, a first set of hidden layers implement a compression algorithm and a second set of hidden layers form a deep convolutional neural network, deep CNN.

The compression algorithm may be a neural-gas algorithm.

The gNB-CU may comprise a part of a hidden layer of the first set of hidden layers implementing the compression algorithm. The gNB-CU may comprise a part of a hidden layer of the second set of hidden layers implementing the compression algorithm. The gNB-CU may comprise at least a part of the second set of hidden layers that form the deep convolutional neural network, deep CNN, for the decompression algorithm.

The gNB-DU may comprise a part of a hidden layer of the first set of hidden layers implementing the compression algorithm. The gNB-DU may comprise at least a part of the first set of hidden layers implementing the compression algorithm. The gNB-DU may comprise a part of a hidden layer of the second set of hidden layers implementing the compression algorithm.

The gNB-DU may comprise at least a part of the second set of hidden layers that form the deep convolutional neural network, deep CNN, for the decompression algorithm.

The gNB-DU may comprise at least a part of an output layer for the decompression as well.

Other NG-RAN nodes may comprise other parts of the input layer or the output layer. The NG-RAN nodes that comprise parts of the input layer or output layer may share the common characteristic.

The distributed machine learning system may implement different machine learning use cases. The use cases may be selectable according to a requirement.

A first use case 1 is for example Realtime Load Balancing. In one aspect the first use case 1 comprises an autoencoder for Realtime Load Balancing.

In the first use case 1, for example a gNB-DU of a plurality of gNB-DU of the NG-RAN comprises the input layer and several hidden layers of the artificial neural network, e.g. the encoder. The plurality of gNB-DUs implement a plurality of encoders.

In the first use case 1, for example a gNB-CU of the NG-RAN comprises the encoding layer.

In the first use case 1, for example a gNB-CU of the NG-RAN comprises the output layer of the artificial neural network, e.g. the decoder.

The gNB-CU of the NG-RAN comprising the decoder is configured to determine the encoding layer from input from one encoder or the plurality of encoders and to decode the encoding layer to determine the output features of the autoencoder.

In the first use case 1, the output features define for example the real time load balancing RT LB.

In this example, the second configuration command may comprise instructions for the gNB-DU to select the input layer for processing in the first use case 1.

The second configuration command may comprise instructions for the first apparatus gNB-DU to select the at least a part of the hidden layer for processing in the first use case 1.

A second use case 2 is for example Non-RealTime Traffic shaping. In one aspect the second use case 2 comprises an autoencoder for Non-RealTime Traffic shaping.

In the second use case 2, for example a plurality of gNB-DUs comprise a distributed input layer and the gNB-CU comprises a plurality of hidden layers. In this example, the encoders are distributed to the plurality of gNB-DUs and the gNB-CU. The hidden layers the gNB-CU comprises, may comprise part of the encoders.

In the second use case 2, for example the gNB-CU of the NG-RAN comprises part of the encoder, the encoding layer and the output layer of the autoencoder. The gNB-CU of the NG-RAN comprising the decoder in this example receives input from at least a part of the distributed input layer, determines the encoding layer depending on this input and determines the output features of the autoencoder depending on the encoding layer.

In the second use case 2, the output features define for example the Non-RealTime-Traffic shaping, Non-RT Traffic Shaping. The Non-RT Traffic Shaping may be determined depending on the output features at the CU-gNB or in an analytics function of the NG-RAN.

The second configuration command may comprise instructions for the gNB-DU to select the input layer for processing in the second use case 2.

The second configuration command may comprise instructions for the gNB-DU to deactivate the at least a part of the hidden layer for processing in the second use case 2.

The second configuration command may enable these use cases and other use cases.

The distributed architecture may be applied to enable for example cell-wide flexible duplexing, i.e. allocate UEs in time-frequency-space, TFS, based on one or more items of the following non exhaustive list of parameters:

1. Service type: QoS requirements, latency, reliability.
2. UE type: handheld device, vehicle, robot in a factory.
3. Experienced channel conditions reported with metrics. e.g. channel quality indicator, CQI, reference signal received power, RSRP, received signal strength indication, RSSI.
4. UE colocation, e.g. UE geolocation.
5. UE velocity reported with maximum Doppler shift.
6. Other UE parameters.

The artificial neural network may be distributed across the NG-RAN nodes. The artificial neural network may be configured by configuration information or trained by training information distributed to these NG-RAN nodes.

Figure 6:
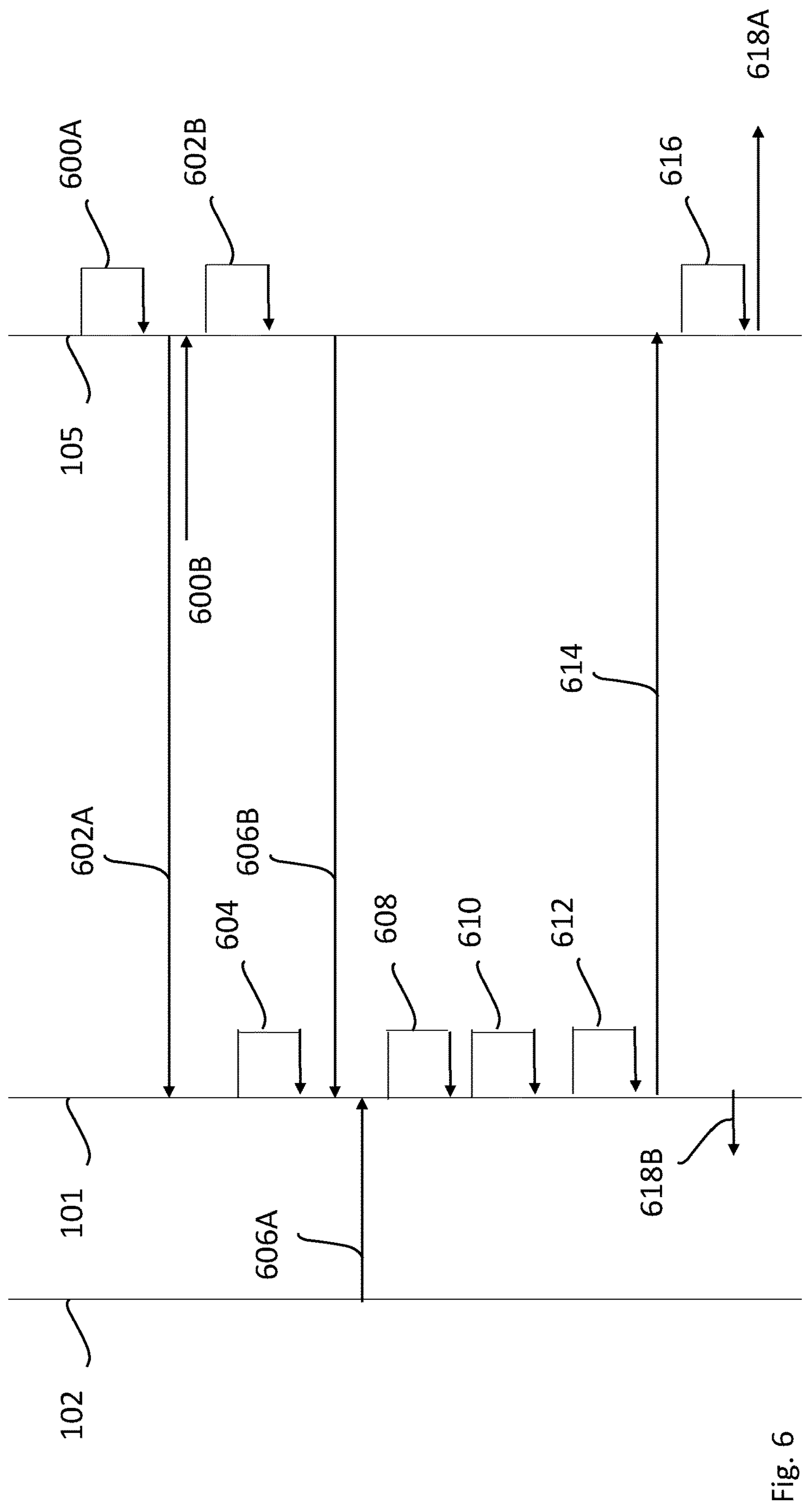

A method of operating a distributed machine learning system is described with reference to the sequence diagram of FIG. 6.

In one aspect, the method comprises determining 600A at the second apparatus 105 signalling to instruct the first apparatus 101 to operate in an operating mode for training the artificial neural network or in an operating mode for inference with the artificial neural network.

The method may comprise determining the first configuration command for the first apparatus 101 for selecting the input for the input layer from the input data in particular the user plane or the control plane depending on the first configuration command for the first apparatus 101.

The method may comprise determining the second configuration command for the first apparatus 101 for selecting the input layer for the input from a plurality of input layers or for selecting the at least part of the hidden layer depending on the second configuration command for the first apparatus 101.

The method comprises sending 602A by the second apparatus 105 the signaling information addressed to the first apparatus 101.

The second apparatus 105 may be operated in an operating mode for training or for inference with the artificial neural network depending on the operating mode determined above for signaling to instruct the first apparatus 101.

The method may comprise receiving 602A at the first apparatus 101 the first configuration command. The method may comprise receiving 602A at the first apparatus 101 the second configuration command.

In one aspect, the method may comprise receiving 602A at the first apparatus 101 signalling information indicating an operating mode for training the artificial neural network or for inference with the artificial neural network. In this aspect the method may comprise sending 600B at the first apparatus 101 signalling information indicating the operating mode for training the artificial neural network or the operating mode for inference with the artificial neural network selected depending on the signalling.

The method may comprise receiving 602A at the first apparatus 101 configuration or training information in particular back-propagation data or weights masking (dropout) from the second apparatus (105).

In another aspect, method may comprise receiving 600B by the second apparatus 105 signaling information regarding the operating mode and instructing 602B the second apparatus 105 to operate in the operating mode for training the artificial neural network or in the operating mode for inference with the artificial neural network selected depending on the signaling.

The method comprises operating 604 the first apparatus 101 in the operating mode for training the artificial neural network or in the operating mode for inference with the artificial neural network according to the signalling.

The method may comprise configuring at the first apparatus 101 at least one parameter, in particular weight or hyper-parameter of the artificial neural network depending on the configuration or training information.

The method may comprise selecting at the first apparatus 101 the input layer for the input from a plurality of input layers or to select 604 the at least part of the hidden layer depending on the second configuration command.

The method comprises receiving 606A at the first device 101 input data in particular user plane data or control plane information from at least one user equipment 102. The method may comprise receiving first input data from a first user equipment 102 and second input data from a second user equipment 102.

The method may comprise receiving 606B at the first apparatus 101 activations, in particular activations of the at least part of the hidden layer.

Optionally, the method may comprise determining 608 at the first device 101 from the input data pre-processed input data.

The method comprises determining 610 at the first apparatus 101 an input to at least a part of at least one input layer of the artificial neural network depending on the input data.

Optionally, input for the input layer of the artificial neural network may be determined depending on the pre-processed input data determined in the optional step 608.

The method may comprise selecting the input for at least the part of the at least one input layer from the input data in particular the user plane or the control plane depending on the first configuration command.

The method may comprise selecting the input for at least the part of the at least one input layer from the input data in particular the user plane or the control plane depending on the first configuration command.

The method may comprise determining an input to a hidden layer of the artificial neural network depending on an output of the at least one input layer.

The method comprises determining 612 at the first apparatus 101 an output of a part of the artificial neural network, in particular activations output by the at least one input layer or activations output by at least a part of a hidden layer of the part of the artificial neural network.

The method may comprise determining the output of the first apparatus 101 depending on activations received at the first apparatus 101 in step 606B. The output of the first apparatus 101 may be activations of the at least part of the hidden layer or output features of at least a part of an output layer of the artificial neural network implemented within the first apparatus 101.

The method may comprise determining the output of the part of the artificial neural network depending on input for the part of the artificial neural network determined depending on at least a part of the first input data and at least a part of the second input data.

The method may comprise determining the output of the part of the artificial neural network depending on the output of the hidden layer.

The method comprises transmitting 614 at the first apparatus 101 the output of the part of the artificial neural network. The output may be transmitted to the second apparatus 105 or to another first apparatus 101. The output of the at least part of the output layer may be transmitted to at least one user equipment 102.

The method comprises receiving at the second device 105 an input for a part of an artificial neural network, in particular activations output by an input layer or at least a part of at least one hidden layer of the artificial neural network. The output of a plurality of first apparatus 101 may be this input.

The method may comprise receiving the input for at least a part of the output layer or the at least part of the hidden layer attributed to at least one user equipment.

In one aspect, the method may comprise receiving a first input for at least a part of the output layer or the at least part of the hidden layer attributed at least to a first user equipment 102 and to a second user equipment 102. In this aspect, the method may comprise receiving a second input for at least a part of the output layer or the at least part of the hidden layer attributed at least to a third user equipment 102 and a fourth user equipment 102.

The method comprises determining 616 an output of the second apparatus 105 depending on the input.

The output of the second apparatus 105 may be determined depending on activations output by a hidden layer of the part of the artificial neural network.

The output of the second apparatus 105 may be an event or KPI for radio resource management, RRM, determined depending on output features of the output layer.

The method may comprise determining a first output of the second apparatus 105 attributed to one user equipment 102 of the at least two user equipment 102 and a second output attributed to another user equipment 102 of the at least two user equipment 102.

In another aspect, the method may comprise determining at least a first output of the second apparatus 105 attributed to the first user equipment 102, a second output of the second apparatus 105 attributed to the second user equipment 102, a third output of the second apparatus 105 attributed to the third user equipment 102 and a fourth output of the second apparatus 105 attributed to the fourth user equipment 102.

The method comprises outputting 618A the output of the second apparatus 105.

The method may comprise determining 618B an output of the first apparatus 101, in particular an event or KPI for radio resource management, RRM, depending on output features of the output layer.

The term processor according to one aspect of the description refers to at least one processor, and at least one memory including computer program code. The at least one processor may comprise dedicated hardware circuitry for processing artificial neural network operations.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first apparatus being a next generation evolved Node B distributed unit (gNB-DU) of a next generation radio access network (NG-RAN), comprising at least:

a receiver configured to receive input data of at least one user equipment;

a processor configured to determine an input to at least a part of at least one input layer of an artificial neural network depending on the input data and to determine an output of a part of the artificial neural network, wherein the artificial neural network is distributed across the gNB-DU and a next generation evolved Node B control unit (gNB-CU) of the NG-RAN;

an interface comprising an F1 control plane (F1-CP) interface of the NG-RAN, configured to receive signalling information from the gNB-CU of the NG-RAN, the signalling information indicating an operating mode for training the artificial neural network or for inference with the artificial neural network, wherein the processor is configured to operate the first apparatus in the operating mode for training the artificial neural network or in the operating mode for inference with the artificial neural network according to the received signalling information, and wherein in the operating mode for inference, the processor is configured to determine an output of the first apparatus comprising an event or key performance indicator (KPI) for radio resource management (RRM) depending on output features of an output layer of the artificial neural network; and a transmitter configured to transmit the output of the part of the artificial neural network.

2. The first apparatus according to claim 1, wherein the interface is further configured to receive configuration or training information for the part of the artificial neural network.

3. The first apparatus according to claim 2, wherein the interface is configured to receive a first configuration command, wherein the processor is configured to select the input for at least the part of the at least one input layer from the input data depending on the first configuration command for the first apparatus.

4. The first apparatus according to claim 2, wherein the interface is configured to receive a second configuration command, wherein the processor is configured to select an input layer for the input from a plurality of input layers or to select the at least a part of a hidden layer depending on a second configuration command for the first apparatus.

5. The first apparatus according to claim 2, wherein the interface is configured to receive configuration or training information; and the processor is configured to configure at least one parameter of the artificial neural network depending on the configuration or training information.

6. The first apparatus according to claim 2, wherein the configuration or training information received via the interface comprises at least one of back-propagation data, weights masking for dropout, or, for reinforcement learning, exploration or exploitation policies.

7. The first apparatus according to claim 1, wherein the receiver is configured to receive first input data from a first user equipment and second input data from a second user equipment and the processor is configured to determine an input for the part of the artificial neural network determined depending on at least a part of the first input data and at least a part of the second input data and to determine the output of the part of the artificial neural network depending on the input for the part of the artificial neural network.

8. The first apparatus according to claim 1, further comprising a pre-processor configured to determine from the input data preprocessed input data, and wherein the processor is configured to determine the input for the input layer of the artificial neural network depending on the pre-processed input data.

9. The first apparatus according to claim 1, wherein the processor is configured to configure at least one parameter selected from the group consisting of a weight, a hyper-parameter, a bias, and an activation function of the part of the artificial neural network in the operating mode for training, and to determine the output of the first apparatus depending on the at least one parameter in the operating mode for inference.

10. The first apparatus according to claim 1, wherein the artificial neural network comprises an autoencoder comprising an encoder and a decoder, and wherein the first apparatus comprises at least a part of the encoder.

11. The first apparatus according to claim 1, wherein the artificial neural network is trained for a cell in the NG-RAN for allocation per user equipment so that a composite cell metric is maximized.

12. The first apparatus according to claim 1, wherein at least a part of a hidden layer or an output layer of the artificial neural network comprises a combining layer having weights that are turned on or off via control signalling from an NG-RAN node or a 5G core network (5GCN) function.

13. The first apparatus according to claim 1, wherein the gNB-DU is one of a plurality of gNB-DUs grouped in a pre-configured group of NG-RAN nodes sharing a common characteristic, the common characteristic comprising at least one of that the gNB-DUs of the group are located in a geographical area, are connected to the gNB-CU, or have similar traffic patterns.

14. A second apparatus being a next generation evolved Node B control unit (gNB-CU) of a next generation radio access network (NG-RAN), comprising:

an input to receive an input for a part of an artificial neural network, the part of the artificial neural network at the gNB-CU comprises at least a part of at least one hidden layer and at least a part of an output layer of the artificial neural network wherein the artificial neural network is distributed across the gNB-CU and at least one next generation evolved Node B distributed unit (gNB-DU) of the NG-RAN;

a processor configured to determine an output of the part of the artificial neural network for at least one user equipment depending on the input;

an interface comprising an F1 control plane (F1-CP) interface of the NG-RAN, configured to send signalling information to the at least one gNB-DU of the NG-RAN, the signalling information indicating an operating mode for training the artificial neural network or for inference with the artificial neural network such that the at least one gNB-DU operates in the operating mode for training the artificial neural network or for inference with the artificial neural network according to the signalling information, wherein in the operating mode for inference, the processor is configured to determine the output of the second apparatus comprising an event or key performance indicator (KPI) for radio resource management (RRM) depending on output features of the output layer of the artificial neural network; and an output configured to output the output.

15. The second apparatus according to claim 14, wherein the processor is configured to determine a first configuration command for selecting an input for an input layer from input data.

16. The second apparatus according to claim 14, wherein the processor is configured to determine a second configuration command for selecting an input layer for an input from a plurality of input layers or for selecting at least part of the hidden layer depending on the second configuration command.

17. The second apparatus according to claim 14, wherein a receiver is configured to receive input for at least a part of an output layer of the artificial neural network or the at least part of the hidden layer attributed to at least one user equipment and the processor is configured to determine a first output of the second apparatus attributed to the at least one user equipment.

18. The second apparatus according to claim 14, wherein a receiver is configured to receive a first input for at least a part of the output layer or the at least part of the hidden layer attributed at least to a first user equipment and to a second user equipment and to receive a second input for at least a part of the output layer or the at least part of the hidden layer attributed at least to a third user equipment and a fourth user equipment and the processor is configured to determine at least a first output of the second apparatus attributed to the first user equipment, a second output of the second apparatus attributed to the second user equipment, a third output of the second apparatus attributed to the third user equipment and a fourth output of the second apparatus attributed to the fourth user equipment.

19. The second apparatus according to claim 14, wherein the processor comprises dedicated hardware circuitry for processing artificial neural network operations.

20. The second apparatus according to claim 14, wherein the second apparatus is configured to communicate with at least one radio resource management (RRM) function via an interface, and the output of the second apparatus comprises output features for at least one of real-time load balancing or non-real-time traffic shaping.

21. The second apparatus according to claim 14, wherein the part of the artificial neural network comprises a first encoder configured to compress an observation set of dimension N×K to a compressed set of dimension P, where P is smaller than N×K, and a second encoder configured to further downsize the compressed set to a resulting set of dimension L, where L is smaller than P, depending on domain knowledge.

* * * * *